(12) United States Patent
Wittenschlaeger

(10) Patent No.: US 7,548,545 B1
(45) Date of Patent: Jun. 16, 2009

(54) DISAGGREGATED NETWORK MANAGEMENT

(75) Inventor: Thomas Wittenschlaeger, Irvine, CA (US)

(73) Assignee: Raptor Networks Technology, Inc., Santa Ana, CA (US)

( * ) Notice: Subject to any disclaimer, the term of this patent is extended or adjusted under 35 U.S.C. 154(b) by 0 days.

(21) Appl. No.: 12/120,024

(22) Filed: May 13, 2008

Related U.S. Application Data

(60) Provisional application No. 61/013,852, filed on Dec. 14, 2007, provisional application No. 61/014,306, filed on Dec. 17, 2007, provisional application No. 61/014,367, filed on Dec. 17, 2007, provisional application No. 61/023,004, filed on Jan. 23, 2008, provisional application No. 61/024,842, filed on Jan. 30, 2008.

(51) Int. Cl.
*H04L 12/28* (2006.01)
*H04L 12/56* (2006.01)

(52) U.S. Cl. ........................ 370/400; 370/522; 709/223

(58) Field of Classification Search ......... 370/216–217, 370/242, 351, 400, 522; 709/223
See application file for complete search history.

(56) References Cited

U.S. PATENT DOCUMENTS

| | | | |
|---|---|---|---|
| 6,671,256 B1 * | 12/2003 | Xiong et al. ................ 370/230 |
| 7,013,335 B2 | 3/2006 | Barnhouse et al. |
| 7,092,999 B2 * | 8/2006 | Levitan ...................... 709/218 |
| 7,337,209 B1 | 2/2008 | Barkai et al. |
| 2002/0097725 A1 * | 7/2002 | Dighe et al. ............. 370/395.1 |
| 2002/0159437 A1 * | 10/2002 | Foster et al. ................. 370/351 |
| 2003/0185148 A1 * | 10/2003 | Shinomiya et al. .......... 370/216 |
| 2004/0032874 A1 * | 2/2004 | Fujiyoshi ..................... 370/401 |
| 2004/0210632 A1 | 10/2004 | Carlson et al. |
| 2006/0171301 A1 * | 8/2006 | Casper et al. ................ 370/225 |
| 2007/0061434 A1 * | 3/2007 | Schmieder et al. .......... 709/223 |
| 2007/0076599 A1 * | 4/2007 | Ayyagari et al. ............. 370/229 |
| 2007/0115806 A1 * | 5/2007 | Onorato et al. ............. 370/219 |
| 2007/0253329 A1 * | 11/2007 | Rooholamini et al. ....... 370/220 |
| 2007/0286198 A1 * | 12/2007 | Muirhead et al. ........... 370/392 |

* cited by examiner

*Primary Examiner*—Kevin C Harper
(74) *Attorney, Agent, or Firm*—Fish & Associates, PC

(57) ABSTRACT

Systems and methods for disaggregated management of a network fabric are presented. Network elements composing the network fabric can operate as a fabric manager with respect to one or more management functions while also continuing to operate as a communication conduit among hosts using the fabric. The roles or responsibilities of a fabric manager can migrate from one network element to another to preserve management coherency as well as to secure management of the network. Additionally, fabric managers communicate with the network fabric through one or more management channels.

20 Claims, 3 Drawing Sheets

DISAGGREGATED NETWORK MANAGEMENT

This application claims the benefit of priority to U.S. provisional application 61/013,852 filed Dec. 14, 2007, U.S. provisional application 61/014,306 filed Dec. 17, 2007, U.S. provisional application 61/014,367 filed Dec. 17, 2007, U.S. provisional application 61/023,004 filed Jan. 23, 2008, and U.S. provisional application 61/024,842 filed Jan. 30, 2008. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is network management technologies.

BACKGROUND

Computer networks continue to grow in size and complexity to service the ever growing communication demands of their users. Networks including LANs, WANs, fabrics, or other networks can comprise hundreds or thousands of individual network elements forming the network's communication backbone. Unfortunately, as the number of elements in the network increases, managing the myriad of elements becomes increasingly difficult. Network fabrics supporting multiple logical data paths through the fabric from one host to another exacerbates the management issues because logical structures, e.g., routes or data paths, also require management.

Traditionally, larger networks are managed through a centralized computer system running expensive management software. However, centralized control of network fabrics introduces numerous disadvantages, especially for network fabrics having a large number of network elements. For example, among other disadvantages, a centralized management system represents a single point of failure. Should the fabric loose a centralized manager, the coherency of the fabric can be lost. Additionally, centralized management systems lack cost effective scalability. When a fabric increases in size beyond the capability of a single manager, a new network management system must be purchased. Furthermore, additional network managers must work together to keep the fabric coherent, which introduces further complexity.

An example of a centralized network management system capable of monitoring and controlling a network of intelligent switching nodes includes U.S. Pat. No. 7,013,335 to Barnhouse et al. Unfortunately, all the management functions for the network are located within the signal management system. As described previously, such a centralized management system represents a single point of failure and lacks an economical path for scaling management of a network.

U.S. patent publication 2004/0210632 to Carlson et al. offers an avenue for eliminating a single point of failure in a management system by providing redundant management servers. The redundant servers maintain communication links with each other to monitor the status of a primary management server. When the primary management server fails, a second server becomes active. Although Carlson provides for redundancy, Carlson also lacks support for fine grained scalability of a network management system.

U.S. Pat. No. 7,337,209 to Barkai et al. attempts to address issues surrounding scalability of network management systems, but also falls short. Barkai describes providing multiple decentralized network management units that manage a portion of the over all network. Unfortunately, the Barkai approach also introduces complexity to network management due to requiring the units to coordinate efforts to ensure the complete network is managed properly.

This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Interestingly, a great deal of effort has been directed toward decentralizing network management. Decentralized network management creates additional scaling problems due to the management of the complexity surrounding coordinating multiple managers to ensure the managed network retains coherency. What has yet to be appreciated is that management functions can be broken down into specific roles or responsibilities. These roles or responsibilities can then be individually assigned to a network element of the network where an individual manages the complete network with respect to a discrete management function. Such an approach reduces the risk of loosing all management functions at the same time, provides for migration of a management function to another manager, or scaling network management through utilizing the network elements as network managers.

Thus, there is still a need for disaggregated network management.

SUMMARY OF THE INVENTION

The present invention provides apparatus, systems and methods in which a network fabric is managed through fabric managers utilizing disaggregated fabric management functions. In a preferred embodiment, a network fabric comprises a plurality of network elements where each element can take on one or more fabric management functions. When an element assumes the role or responsibility of a management function, it becomes a fabric manager and manages the fabric (e.g., the other elements and itself) with respect to the function. A fabric manager preferrably communicates with the other elements through a management channel constructed from a set data channels within the fabric.

Preferably, each element is equally capable of becoming a fabric manager. For example, in one aspect of the inventive subject matter, more than one element has the mantle of fabric manager where each element operates according to a different management function.

In other aspect of the inventive subject matter, management responsibilities can migrate from one element to another. For example, to ensure a fabric manger remains secure (e.g., protected from external threats) its management functions can be moved to another, less threatened element. Furthermore, a management channel can also be secured by shifting which paths through the network are used to convey management information.

Various objects, features, aspects and advantages of the inventive subject matter will become more apparent from the following detailed description of preferred embodiments, along with the accompanying drawings in which like numerals represent like components.

DETAILED DESCRIPTION

Although the following description provides examples of network fabrics having a small number of network elements or data channels, it should be noted that a fabric can comprise any number of elements or data channels.

Network Fabric

Figure 1:
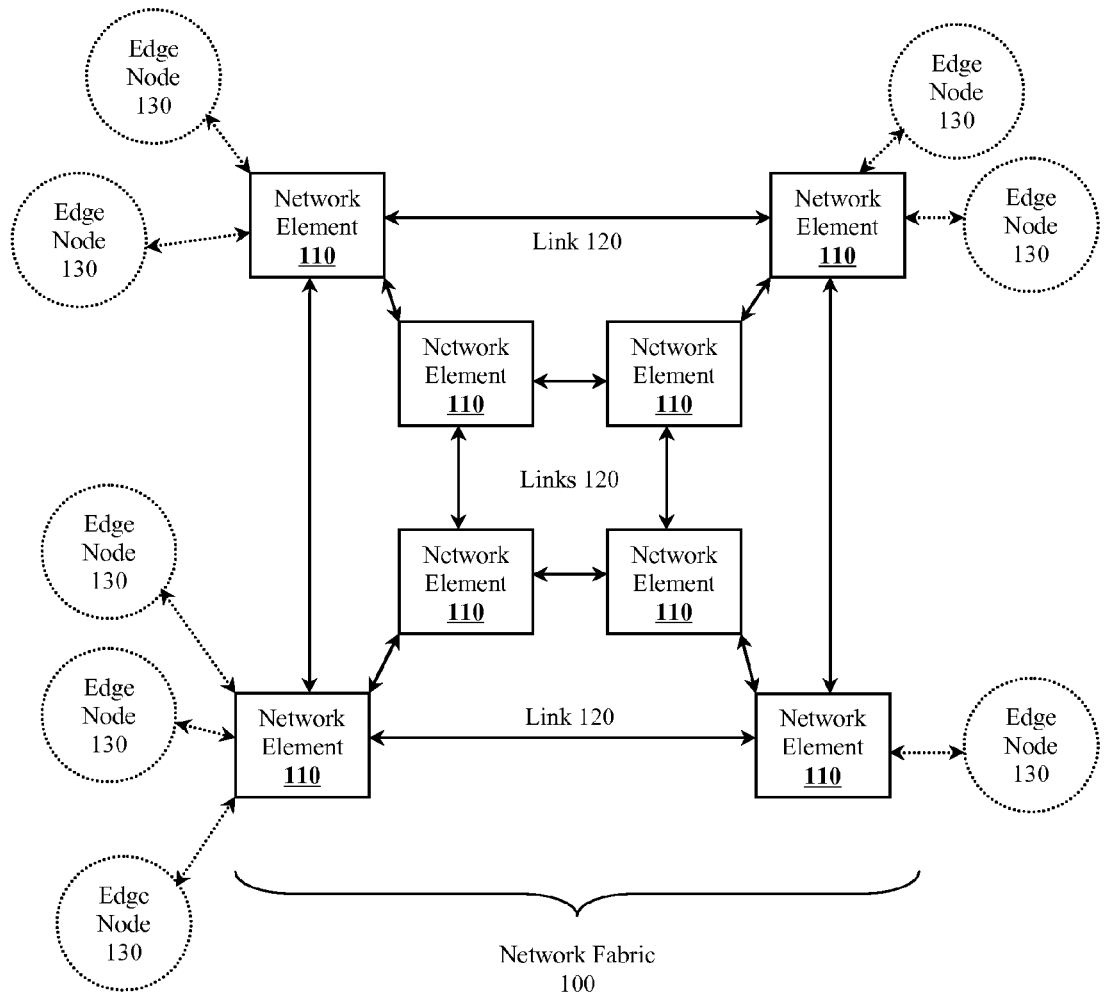
FIG. 1 is a schematic of a distributed core fabric.

In FIG. 1 network fabric 100 comprises a plurality of network elements 110 interconnected through a plurality of physical communication links 120 connecting neighboring network elements. In a preferred embodiment, data channels can be established across one or more of links 120 to connect any network element 110 to another element 110. Additionally, data channels can also connect one of edge node 130 to another edge node 130. Network fabrics can include fabrics for internetworking, storage area networks, mesh networks, peer-to-peer networks or other network fabrics.

Edge nodes 130 can include any system connected to network fabric 110. Example edge nodes include computers, set-top boxes, game consoles, storage devices, handheld devices (e.g., mobile phones, PDAs, etc. . . . ), or other devices that would benefit from network access.

In a preferred embodiment, network elements 110 comprise network switches that when connected together provide dynamic routing across the fabric, preferably at layer two of the OSI model. Although the preferred embodiment provides a fabric at layer two of the OSI model, it is also contemplated that the inventive subject matter can be advantageously applied to other layers including layer three of the OSI model (e.g., IPv4 or IPv6) or above. It is contemplated that links 120 can include wires, wireless channels, optic fibers, IrDA, fiber channel, Infiniband, or other communication links.

Network elements 110 should not be considered limited to network switches, Ethernet or otherwise. Rather network elements 110 can also include other forms of networking infrastructure including routers, bridges, gateways, access points, repeaters, or other networking devices offering interconnectivity.

Preferably, each of link 120 is a point-to-point communications link, wired or wireless, between two connected neighboring elements. In a preferred fabric, each physical link 120 between two elements can also support multiple data channels on the same link. For example, a single optic fiber representing a link between two neighboring network elements 110 can support multiple data channels where each data channel on the optic fiber uses a different wavelength of light to transport data.

Fiber optic communication links, among other links, provide for geographically separating network elements 110 from each other. Preferred fabrics comprises at least two of network element 110 separated by more than 1 Km, and yet more preferred fabrics have elements 110 that are physically separated from each other by more than 10 Km.

One should note that a logical data channel, herein referred to as a "data channel", can be constructed through the fabric between two elements 110, neighboring or otherwise, or two edge node 130. A data channel can be constructed as a path along one or more point-to-point links 120 using a low-level protocol, Ethernet, for example. Alternatively, a data channel can be constructed using a high-level protocol (e.g., IPv4, IPv6, TCP, UDP, etc. . . . ) where the channel can be defined by its end points (e.g., IP address, port assignment, network name, etc. . . . ) as opposed to the route through fabric. Especially preferred data channels include session based channels where elements 110 retain connectivity within a session even though links 120, TCP/IP connections, or other paths change within the session. An example of a data channel includes a selected wavelength of light on a physical optic fiber link. Another example of a data channel includes a TCP/IP connection between one of network elements 110 and another network element 110.

Data channels are preferably constructed by a fabric manager, whose responsibilities include storing route tables, disseminating routes, or assigning paths. Co-owned U.S. Pat. No. 7,352,745 titled "Switching system with distributed switching fabric" issued Apr. 1, 2008, describes suitable methods for establishing data channels through a switched fabric.

In a preferred embodiment, fabric 100 comprises a distributed core fabric. Raptor Network Technology, Inc. of Santa Ana Calif. (http://www.raptor-networks.com/) provides suitable network switches including the ER-1010 switch. Multiple ER-1010 switches can be deployed to form a distributed core fabric by connecting the switches through optic fibers. The ER-1010 switch offers an advantage because individual switches can be physically separated by more than 1 Km, more than 10 Km, or even more than 100 Km. As used herein, "distributed core" means a plurality of network elements operating as a single coherent device. For example, interconnected Raptor switches can function as a single large switch.

A distributed core fabric architecture preferably lacks a need for spanning tree protocol because the network fabric comprises elements that self-organize to behave as one coherent device. Once organized, data is then routed dynamically through fabric via one or more constructed data channels.

Preferably, the distributed core includes network elements that are fungible with respect to fabric management functions. The management functions can be assigned to any network element located anywhere within the core as described more fully below.

Fabric Management

Figure 2:
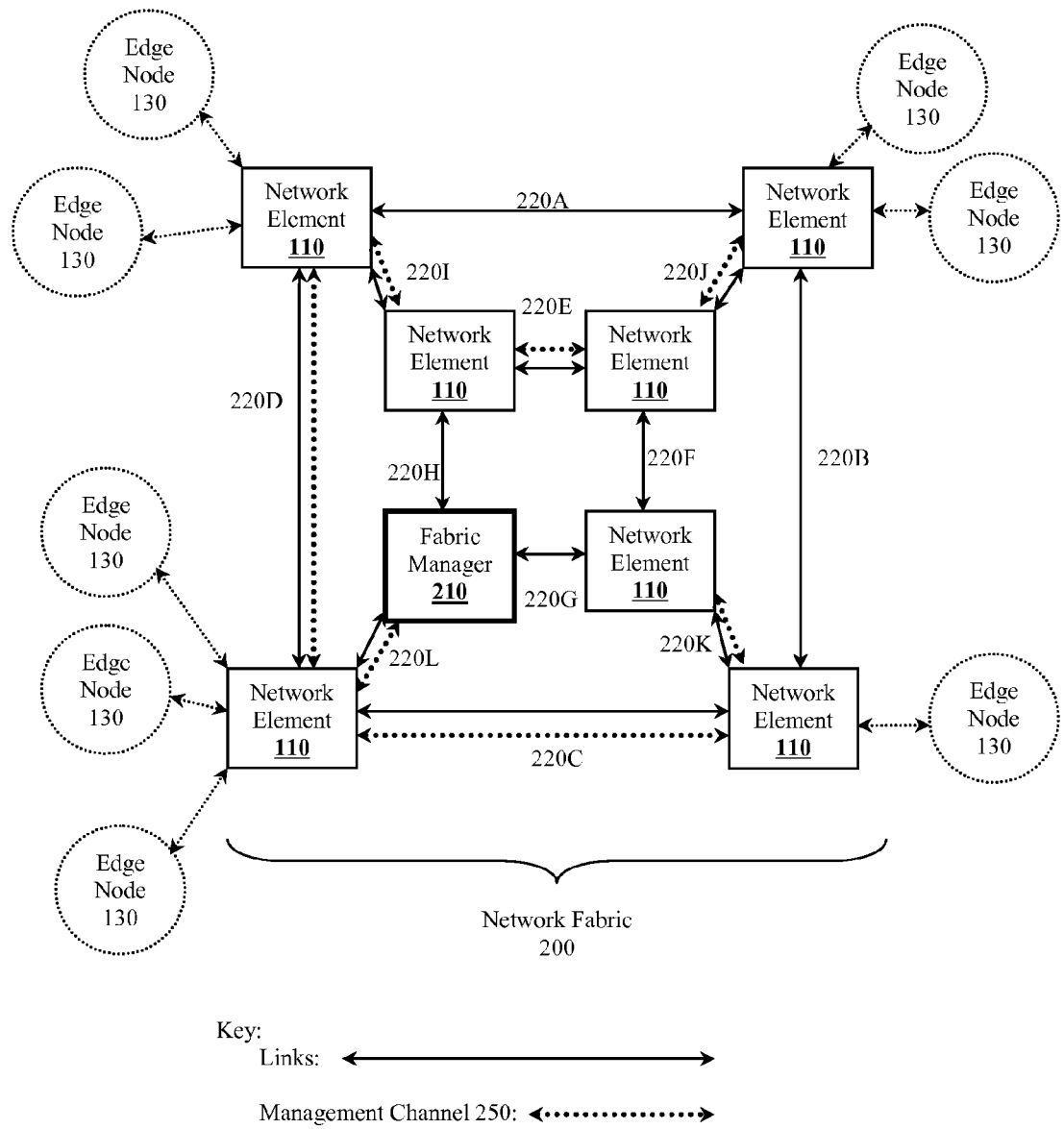
FIG. 2 is a schematic of the fabric of FIG. 1 having a fabric manager and a management channel.

In FIG. 2 network fabric 200 comprises a fabric manager 210 that communicates management information with network elements 110 over management channel 250. In a preferred embodiment, fabric 200 includes fabric manger 210, most preferably one of network elements 110. At least one of network elements 110 takes on the roles or responsibilities of the fabric manager by adopting a management function.

Management Functions

As previously mentioned, network elements 110 are fungible with respect to a plurality of management functions representing one or more of any possible management roles or responsibilities. Management functions are contemplated to include assigning paths through the fabric, storing route tables, disseminating route information, monitoring, alerting, logging, event handling, reporting, recovery, security, provisioning, configuration, or other network management functions well known in the art or yet to be conceived.

In a preferred embodiment, management functions are disaggregated in a manner where each management function operates as a one or more software modules operating on stored management data and executing on any of network element 110. Rather than fabric manager 210 processing all management functions relating to fabric 200, fabric manager 210 processes a reduced set of management functions, preferably two or less.

Contemplated software modules representing management functions can be implemented in any suitable manner. Preferred software modules include those that are resident in memory of network elements 110 a priori before deployment and can simply be toggled "on" to begin executing. Other contemplated software modules include those that are installed after elements 110 are deployed in the field. Such modules can be installed through a firmware upgrade or through management software.

Although management functions are disaggregated, each function preferably retains command or control of the whole fabric. It is also contemplated that duplicate fabric managers could be responsible for the same management function to provide redundancy, where a management function rapidly migrates to a new fabric manager as discussed below. It is contemplated that one duplicate fabric manager would be the active manager while another duplicate would be passive.

Management functions can operate independently from other management functions or can operate in a manner that is dependent on other management functions. Consider for example, fabric manager 210 having responsibility for collecting an inventory of network elements 110. Ordinarily, fabric manager 210 could query all the elements for inventory information and then report the findings to an administrator. The collection of the inventory could occur independently of all other management functions. Alternatively, inventory collection could also depend on other management functions. For example, when additional elements are introduced into the network, a configuration fabric manger might send a message (e.g., a unicast, a broadcast, an anycast, or a multicast message) via a management protocol to suppress an inventory manager from operating until all new elements are configured properly. In this sense, management functions can depend on each other. Management protocols can include SNMP, HTTP, web service based protocols, or other protocols used to send management information.

Fabric Manager

In a preferred embodiment, fabric manager 210 is selected from a plurality of network elements 110 and is configured to provide a management function selected from a plurality of management functions.

The selection of fabric manager 210 can occur through any suitable known method. However, preferred methods are those that identify the fabric manger rapidly. Fabric manager 210 can be identified initially through the use of a management discovery protocol based on various characteristics associated with elements 110 as described in parent application U.S. patent publication 2005/0105538. For example, the MAC addresses for each element can be discovered and the element with the lowest, responsive MAC address becomes a manager.

As fabric manager 210 takes on the responsibility of a management function, manager 210 operates to command or control fabric 200 by monitoring one or more fabric metrics relating to the function. Fabric metrics can be observed directly by fabric manager 210 or more preferably aggregated from network elements 110 where each network element provides a metric report to fabric manager 210 through management channel 250.

Fabric manager 210 preferably communicates with network elements 110 through management channel 250. Fabric manager 210 sends command or control data through management channel 250 to govern various aspects of the fabric with respect to the manager's assigned management function. Messages can be sent using any known protocols or techniques including TCP, UDP, IP, HTTP, SNMP, or other networking protocols.

Management Channel

Management channel 250 represents a communication system constructed from a plurality of data channels interconnecting fabric 200. In the example shown in FIG. 2, management channel 250 comprise one or more data channels utilizing links 220L,C,D,I,E,J, and K. As fabric manager 210 communications with network elements 110, each network element forwards management information along the links to other network elements. It should be appreciated that management channel 250 could comprise any combination of data channels or links to ensure communication extends to the whole fabric.

In some embodiments, fabric manager 210 maintains point-to-point connections with individual elements 110. For example, management channel 250 can be identified as a session comprising one or more TCP/IP connections spread among network elements 110. In other embodiments, management channel 250 could be represented by a channel identifier used by each of network elements 110 to determine which of links 220 should be used to forward management information.

In a preferred embodiment, management channel 250 and its associated data channels or links 220 are dedicated to only sending fabric control data as opposed to transporting bulk data. However, it is contemplated there are circumstances in which bulk data can be transported over management channel 250 in addition to transporting fabric control data. For example, when the demands for bulk data bandwidth exceeds capacity of the fabric, fabric manager 210 could then elect to release exclusivity of management channel 250 to allow bulk data to be transported to increase available bandwidth for bulk data or to increase the throughput for bulk data.

Fabric manger 210 also communicates with the rest of the fabric collectively or with each of network elements 110 through management channel 250. As fabric 200 requires management, fabric manager 210 sends fabric control data to the elements within the fabric. However, it is contemplated that the use of management channel 250 can become inefficient with respect to one or more of the metrics or otherwise interfere with the transport of bulk data.

While monitoring fabric metrics, fabric manager 210 could discover that management channel 250 should be moved to improve the efficiency with respect to the metrics of a portion of the fabric or of the overall fabric. Manger 210 then selects another management channel through which fabric control data is disseminated to the rest of the fabric.

Selecting a new management channel as a function of the fabric metrics can be performed by any suitable policy or rules set. For example, if bulk data bandwidth is the primary metric to optimize, then manager 210 can select a new management channel constructed from unused data channels. By moving the management channel to utilize unused data links, bandwidth can be freed for bulk data thereby increasing available bandwidth. For example, a heavily used link 220J of management channel 250 could be replaced by unused link 220A to retain connectivity with all the elements.

The fabric manager disseminates the new management channel identification to the network elements 110 through one or more possible avenues. In some embodiments, the new management channel identification information is sent through a previous management channel. In other embodiments, the new management channel identification is broadcast or multicast over one or more other data channels.

In an especially preferred embodiment, fabric manager 210 constructs management channel 250 using a secure or otherwise secret algorithm. For example, a secret key can be used as a seed for a pseudo-random number generator where the key or generator are known only to fabric manager 210 and other network elements 110 within fabric 200. When necessary, manager 210 uses the key to determine the next management channel. Upon notification of a change in management channel 250, all other network elements use the secret key to automatically determine what the new channel will be. Such a system could employ methods similar to those employed by SecureID™ to determine the next management channel.

To further clarify the use of management channel 250, consider an example where fabric 200 comprises network elements 110 communicating through optic fibers. Each optic fiber can have multiple data channels distinguished by wavelength, $\lambda_1$, $\lambda_2$, up to $\lambda_n$. Data can be transported across any physical optic fiber link 220 using any of the wavelengths. Fabric manager 210 could select $\lambda_2$ as the management channel where all network elements 110 begin using channel $\lambda_2$ for all fabric control data exchanges on a physical links 220.

It should also be noted that management channel 250 does not necessarily have to be isolated to a single wavelength on each link 220 but can be a logical channel aggregated from two or more data channels. To continue with the previous example, fabric manager 210 of fabric 200 could decide that half of network elements 110 use $\lambda_1$ for inter-element communication while the other half uses $\lambda_2$. Under such circumstance, management channel 250 comprises both wavelengths. Such combinations allow fabric manager 210 to create local optimizations within fabric 200 as well as global optimizations with respect to the metrics. In this sense, fabric manger 210 is able to create a management fabric within fabric 200 through which fabric control data can be routed. Such a management fabric can be reconfigured in a similar fashion that bulk data transport paths are reconfigured over the fabric to maintain connectivity among edge nodes should connectivity be lost between elements.

Preferred dedicated management channels include those that have low latency, less than 10 microseconds or high throughput greater than 10 Gbps. Embodiments employing Raptor™ cut-through switches typically achieve element-to-element communication latencies less than five microseconds and can support a throughput of more than 30 Gbps by aggregating multiple links.

Non-Interfering Management Channels

Network elements 110 preferably communicate over links 220 using one or more signaling protocols controlled through PHYs. A signaling protocol represents the actual signaling used to transport information across a media as controlled by a PHY. For example, switches employ optical PHYs that send signals using different wavelengths of light or employ Ethernet PHYs that send signals using different electrical frequencies. In a preferred embodiment, management channel 250 utilizes one or more signaling protocols that minimally impact general data transport.

It is contemplated that management communication using a second signaling protocol over a link 220 can have a bandwidth that exceeds 10 Mbps without negatively impacting general purpose data transport over the same link 220 using a first signaling protocol.

Furthermore, a preferred network element 110 using a second signaling protocol for management information will retain an effective general purpose data bandwidth of at least 70% of the theoretical maximum of the physical medium. Especially preferred network elements 110 retain effective general purpose data bandwidth of at least 90% of the theoretical maximum on the same link 220.

As used herein, "non-interfering" means general purpose data bandwidth, latency, or other network metric is impacted by less then 5% when management data is being transported over the same link 220 as used for general data transport. In especially preferred embodiments the impact is less than 1%.

One should note that the frequency of the second signaling protocol can be higher or lower than the primary frequency of the first signaling protocol used to transport general purpose data. On should also note that the second signaling protocol can also include a standardized signaling protocol that does not interfere with the first standardized signaling protocol.

Preferably the second signaling protocol utilizes a frequency that is other than a harmonic of the first signaling protocol. By having the second signaling protocol avoid harmonics of the first signaling protocol, one ensures that management data will not cause interference or other reception problems with the general purpose data.

Preferred network elements 110 include two PHYs coupled to the links 220 where a first PHY is used to detect general purpose data transported using the first signaling protocol while the second PHY is used to detect management data transported using the second signaling protocol. Especially preferred embodiments have a single PHY unit that packages the functionality of the first and second PHYs. Contemplated PHYs can differentiate signals from the two signaling protocols by using any known techniques including wavelength-division multiplexing. When multiple PHYs are employed, management channel 250 could clearly comprise multiple signaling protocols, possibly through the use of a multi-link protocol.

Multiple Managers and Management Channels

Figure 3:
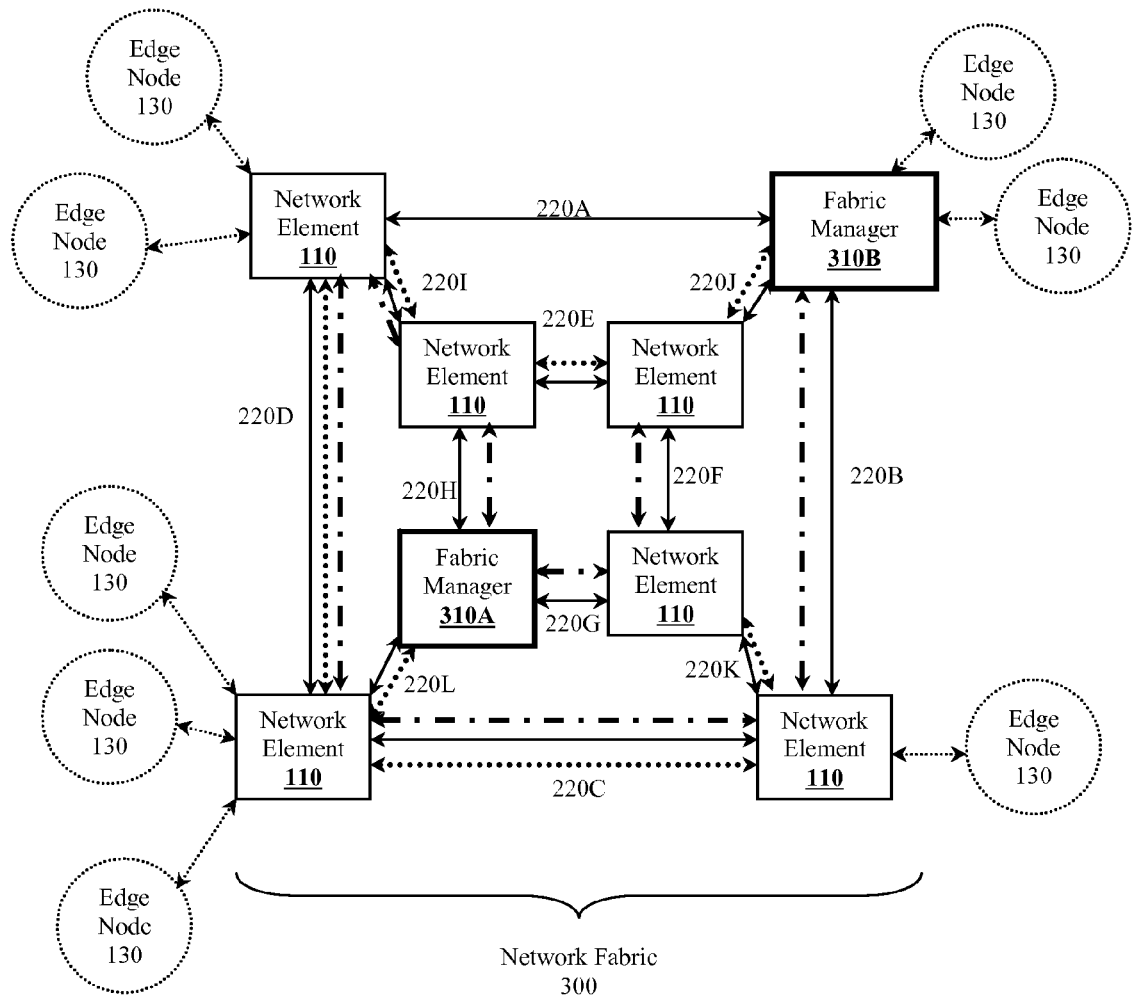
FIG. 3 is a schematic of the fabric of FIG. 2 having more than one fabric manager and having more than one management channel.

In FIG. 3 network fabric 300 comprise fabric manager 310A and 310B, each capable of communicating with network elements 110 through management channels 350A or 350B. Fabric 300 provides an example fabric for the following discussions.

It should be noted that more than one fabric manager can exist in fabric 300 at the same time. In the example show, fabric manager 310A is preferrably configured to provide first management function while fabric manager 310B is configured to provide a second management function. Although both mangers could be redundant by providing the same management function, in a preferred embodiment the two management functions are different. For example, fabric manger 310A could be responsible for providing event notifications to system management software (e.g., HP™ OpenView™ or IBM™ Tivoli™) while fabric manager 310B could be responsible for establishing routes through fabric 300.

Migrating Management Functions

In a preferred embodiment, a fabric management function that resides in fabric manager 310A can migrate to another element, fabric manager 310B, deterministically under various triggering circumstances. Migrating management functions from one network element 110 to another element 110 provides several advantages. For example, migrating management functions allows for replacing a failed fabric manager or provides for securing the management of the fabric as discussed below.

Consider, for example, a scenario where fabric manager 310A operates according to a management function responsible for route dissemination. Such a management function represents a critical function to ensure fabric 300 retains coherency. Should a hostile entity attack manager 310A causing it to fail, fabric 300 would be in jeopardy. Upon detection of the attack, manager 310A could simply migrate the route dissemination responsibilities to another network element that would become fabric manager 310B.

In one embodiment, fabric management functions are migrated due to a trigger event operating as a function of time or condition. Preferably a time trigger includes periodically migrating management functions from element 110 to another element 110. Under such conditions, each element 110 is aware of or otherwise identifies which element 110 will next have a specific management function. In another embodiment, management functions are migrated when triggered by observation of fabric metrics, which could include detecting flooding from a specific element 110 in the fabric. When fabric manager 310A is flooded, its responsibilities are migrated to manager 310B to ensure fabric 300 is harder to attack from an external source.

Preferably elements 110 in fabric 300 are fungible with respect to the management functions so that any one of the elements is capable of taking over the responsibilities of another. One should note the term "migration" is used euphemistically to describe the transfer of a set of responsibilities even though no actual data exchange among elements is required. In this sense, each element is programmed to rapidly identify the next fabric manager from among elements 110 connected to the network as a result of a triggering event. Fast migration can be achieved by having each element 110 store a data file in memory having the management information relating to a management function. For example, each element 110 could store all routing maps and path assignment information. When an element 110 takes on the mantle of a fabric manager with respect to routing paths through the fabric, the element is not required to rebuild its view of the network before beginning to operate.

"Rapid migration" means elements in the fabric identify a new fabric manager having a management function in less than 10 seconds. In more preferred embodiments, the transfer of management responsibilities takes place in less than 5 seconds. In yet more preferred embodiments, the transfer takes place in less than 1 second. In especially preferred embodiments, the transfer takes place in less than 100 microseconds. Contemplated distributed core fabrics employing optic fiber links can identify a fabric manager with extremely low latency, less then 100 microseconds. For example, in embodiments where elements are have synchronized management data, a new element selected to be the new fabric manager can be identified in much less than five seconds.

In some embodiments, periodic movement of management functions occurs regularly in time where once during a defined time period, management functions are migrated to another element 110. In a preferred embodiment the next element 110 that becomes the fabric manager is controlled by a secret key only known to the elements. The elements each have the same key and use it as a seed key to search a table of all elements to determine which element is next to be manager. When all the elements use the same key and the same search algorithm, the next fabric manager can be identified deterministically in a near instantaneous fashion. Furthermore, the elements are not required to communicate with each other to identify the new fabric manager.

Many known algorithms or protocols can be used for key generation or key exchange and would be suitable for secure selection of an element as a fabric manager. Suitable algorithms or protocols include AES, PGP, 3DES, Diffie-Hellman, SSL, SSH, RSA's SecureID, or other cryptographic algorithms or protocols. All algorithms or protocols that protect information exchange between network elements are contemplated.

In other embodiments, the migration occurs irregularly in time where the time period between migrations alters. The irregular time periods can also be governed by secret key only known to the fabric elements using similar techniques as described above. In such embodiments, the time period is preferably less than a maximum value. Having a maximum threshold value ensures migration happens quickly enough to avoid attacks while varying the time period to confuse an attacker. The maximum value is preferably less than 10 minutes and more preferrably less than 30 seconds.

One should note that securing key information within the network elements should also be considered. Some embodiments employ internal security measures to protect the element's memory storing key information. Preferred elements secure key information by adhering to a security standard including Federal Information Processing Standard (FIPS) 140-2, FIPS 140-3, or its variants.

Although preferred embodiments include migrations that occur periodically and rapidly in a deterministic fashion, other contemplated approaches also fall within the scope of the inventive subject matter. One alternative non-deterministic approach includes rapidly converging on a new fabric manager as opposed to selecting a next element from a list. For example, when it is time for a new element to take on management responsibilities, the elements can bid on becoming the manager or elect a new manager. A requirement for such a process could include the bid or election process converging on the new manager rapidly. However, the process would not be deterministic. The process would lack determinism because no element could know a priori which element would become the fabric manager. Lacking such knowledge provides further security because an attacker that has access to an element's memory would not be able to determine which element will be the next fabric manager.

One should appreciated the role of disaggregate management functions within contemplated fabric 300. Fabric 300 has increased security by having each fabric manager 310A or 310B operating according to different management functions. Fabric 300 is further secured by rapidly migrating management functions from element to element. An external threat would find tracking or attacking a central authority for management difficult, if not impossible.

Migrating Management Channels

In preferred embodiment, fabric managers 310A and 310B can also migrate their respective management channels 350A and 350B from a set of data channels to a new set of data channels in a similar fashion as management functions are migrated. The data channels used to form each management channel 350A or 350B can also change dynamically in real-time. Such agile hopping from channel to channel further protects fabric 300. For example, fabric manager 310A could migrate management channel 350A to management channel 350B by informing elements of the new management channel or by constructing management 350B from available data channels.

It should be appreciated that management channel 350A or 350B could remain in place while its data channels change. In a preferred embodiment, elements 110 employ a port-to-port protocol that allows two neighboring elements to choose which ports, or wavelengths on a port, they will use to communicate with each other. For example, link 2201 could be a fiber optic link supporting over ten different data channels, each at a different wavelength of light. Although link 2201 is a member of both management channels 350A and 350B, the two elements can change their preferred wavelength (e.g., change their data channels) without requiring either management channel to be altered. In such a configuration, elements 110 can assert localized management of a management channel's data channels.

Consider, for example, where fabric 300 comprises Ethernet switches linked together through copper wire or optic fibers and where fabric manager 310A is responsible for path assignments and routing. Fabric manager 310A can configure management channel 350A to be agile on multiple frequencies (e.g., for copper connections) and on multiple wavelengths (e.g., for fiber connections). Fabric manager 310A could also configure data transport paths as being segmented on complimentary, non-interfering agile frequencies or separate, non-interfering agile wavelengths on the same links as the management channel 350A. Such a configuration provides a higher effective resilience to DNS-style attacks by frequency or wavelength "hopping" upon detection of such attacks or on random, aperiodic (e.g., irregular) intervals as described above with respect to migrating management functions.

Management channel migration might be considered the equivalent, in networking, of "bifurcated frequency hopping" in jam-resistant military radios. This functionality is enabled by a distributed core fabric which dynamically routes paths in real-time through fabric 300.

Preferably, network elements 110 also store management channel information in memory. By storing information relating to migration of management channels, all elements remain synchronized when a management channel must change. For example, fabric manager 310A can update all network elements 110 with route table and path assignment information, which is stored in each element's memory. Management channel 350A can be identified via a UUID or GUID and corresponds to a set of data channels. When necessary, possibly in response to a change in a fabric metric or at a specific time, all elements migrate to management channel 350B having different data channels possibly identified by a different identifier. Additionally, a management channel can be migrated periodically in a secure fashion based on a secret key stored in memory of fabric manager 310A or other elements 110. Such secure migration can be performed as described previously with respect to management functions.

In some embodiments, network elements 110 include a synchronized timer to ensure the elements can operate in a coordinated fashion when identifying fabric managers or new management channels. Example timers include those based on GPS, network time protocols, system clocks, or other synchronized clocks. At synchronized moments in time, elements 110 can determine the new configuration as a function of a stored secret key. Through such a method, the new configuration can be rapidly identified, in a near instantaneous fashion.

It should be appreciated that the disclosed techniques provide for establishing a management fabric overlay within a network fabric. The management fabric represents a logical topology that itself can be non-interfering with respect to general data transport.

It should also be appreciated that the disclosed techniques can be employed to manage other forms for network fabrics. Example network fabrics include mesh networks, wireless networks, or even peer-to-peer networks. Providing fabric managers and management channels to such fabrics having loose confederation of network elements would increase the robustness of the fabrics.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A managed network fabric comprising:
   a plurality of network elements interconnected through a plurality physical data links each supporting a plurality of data channels available for general data transport where each element is fungible with respect to a plurality of fabric management functions;
   a first fabric manager selected from the plurality of elements and configured to provide a first fabric management function selected from the plurality of fabric management functions;
   a first management channel constructed from the plurality of data channels selected as a function of a key, and dedicated to transport management information relating to the first fabric management function, where the first management channel comprises two different ones of the data channels on two different ones of the physical links; and
   wherein the fabric manager is further configured to communicate the management information over the management channel with at least some of the elements.

2. The fabric of claim 1, further comprising a second fabric manager selected from the plurality of elements and configured to provide a second fabric management function selected from the plurality of fabric management functions, wherein the second fabric manager is different from the first fabric manager and wherein the second fabric management function is different from the first fabric management function.

3. The fabric of claim 2, wherein the second fabric management function depends on the first fabric management function.

4. The fabric of claim 1, wherein the first fabric manager is geographically separated from another of the plurality of elements by at least 10 Km.

5. The fabric of claim 1, wherein the first management channel supports communicating with the at least some of the elements with a latency less than about ten micro seconds.

6. The fabric of claim 1, wherein the first management channel supports sending the management information with a throughput of at least 30 Gbps.

7. The fabric of claim 1, wherein the first management channel comprises a non-interfering data channel with respect to a data transport channel.

8. The fabric of claim 1, wherein the first management channel comprises more than one signaling protocols.

9. The fabric of claim 1, wherein the first fabric manager is configured to migrate from the first management channel to a newly constructed second dedicated management channel.

10. The fabric of claim 9, wherein the second management channel is constructed in response to observed fabric metrics.

11. The fabric of claim 9, wherein the first management channel is migrated to the second management channel periodically in a secure fashion based on a secret key.

12. The fabric of claim 1, further comprising a management fabric that includes the first management channel.

13. The fabric of claim 1, wherein the plurality of elements are configured to migrate the first fabric management function from the first fabric manager to a different fabric manager element.

14. The fabric of claim 13, wherein each of the elements is configured to rapidly identify the different fabric manager element in response to (a) a time or (b) a condition.

15. The fabric of claim 14, wherein at least some of the elements identify the different fabric manager element within at least five seconds.

16. The fabric of claim 13, wherein each of the elements comprises a memory storing a key used to identify the different fabric manager.

17. The fabric of claim 1, wherein the first fabric management function comprise a function selected from the group of disseminating routes, storing route tables, assigning paths, monitoring, collecting an inventory, logging, alerting, reporting, recovering, and enforcing security.

18. The fabric of claim 1, wherein the fabric comprises a peer-to-peer network that includes at least some of the plurality of elements.

19. The fabric of claim 1, wherein the plurality of elements comprise a distributed core fabric.

20. The fabric of claim 19, wherein the distributed core fabric comprises switches.

* * * * *